United States Patent
Liang et al.

(10) Patent No.: US 9,897,443 B2
(45) Date of Patent: Feb. 20, 2018

(54) THICKNESS DETECTION DEVICE FOR SHEET MEDIUM

(71) Applicant: GRG Banking Equipment Co., Ltd., Guangzhou, Guangdong (CN)

(72) Inventors: Tiancai Liang, Guangdong (CN); Minjie Fang, Guangdong (CN); Chengye Zhang, Guangdong (CN); Fei Zhao, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/543,617

(22) PCT Filed: Aug. 10, 2015

(86) PCT No.: PCT/CN2015/086467
§ 371 (c)(1),
(2) Date: Jul. 14, 2017

(87) PCT Pub. No.: WO2016/123949
PCT Pub. Date: Aug. 11, 2016

(65) Prior Publication Data
US 2017/0370711 A1    Dec. 28, 2017

(30) Foreign Application Priority Data

Feb. 5, 2015 (CN) .......................... 2015 1 0062226

(51) Int. Cl.
*G01B 21/08* (2006.01)
*G01B 21/16* (2006.01)

(52) U.S. Cl.
CPC ............. *G01B 21/08* (2013.01); *G01B 21/16* (2013.01)

(58) Field of Classification Search
CPC ........ G01B 5/06; G01B 7/06; G01B 11/0691; B65H 2220/01; B65H 2511/13;
(Continued)

(56) References Cited

U.S. PATENT DOCUMENTS 4,378,109 A * 3/1983 Takahashi ................ B65H 7/12
209/603
9,592,981 B2 * 3/2017 Xie .......................... B65H 7/02
(Continued)

FOREIGN PATENT DOCUMENTS

CN    101451818 A    6/2009
CN    101607641 A    12/2009
(Continued)

OTHER PUBLICATIONS

International Search Report and Written Opinion for Application No. PCT/CN2015/086467 dated Oct. 29, 2015.

*Primary Examiner* — Yaritza Guadalupe-McCall
(74) *Attorney, Agent, or Firm* — Wolf, Greenfield & Sacks, P.C.

(57) ABSTRACT

A thickness detection device for sheet-type medium includes a fixing frame, a reference shaft and a detection assembly shaft. A reference roller is fixedly sleeved on the reference shaft. At least one detection roller is provided on the detection assembly shaft, and the detection roller is in an elastic contact with the reference roller. The detection roller is sleeved on the detection assembly shaft by a bracket, the bracket has an elongated hole through which the bracket is sleeved on the detection assembly shaft, an elastic element is provided between an end of the elongated hole and the detection assembly shaft, and the elastic element enables the detection assembly shaft to elastically maintain a certain distance from the end of the elongated hole. Thus, thickness signal obtained is not interfered by banknote displacements
(Continued)

in other directions, and thickness detection of the full banknote can be achieved.

6 Claims, 5 Drawing Sheets

(58) Field of Classification Search
CPC ............ B65H 2220/03; B65H 2220/02; B65H 2220/11; B65H 2511/11
USPC .......................................... 33/501.03, 501.04
See application file for complete search history.

(56) References Cited

U.S. PATENT DOCUMENTS

| | | | |
|---|---|---|---|
| 2003/0168308 A1 | 9/2003 | Maier et al. | |
| 2007/0234582 A1* | 10/2007 | Kondo | G01B 11/0691 33/501.04 |
| 2008/0189968 A1* | 8/2008 | Schletti | G01B 7/107 33/501.4 |
| 2011/0210505 A1* | 9/2011 | Tomii | B65H 7/02 271/265.04 |
| 2011/0210506 A1* | 9/2011 | Yamazaki | B65H 7/02 271/265.04 |
| 2012/0137533 A1* | 6/2012 | Muranaka | B65H 7/02 33/833 |
| 2013/0200565 A1* | 8/2013 | Takenaka | B65H 5/062 271/273 |
| 2013/0276526 A1* | 10/2013 | Wang | G01B 5/06 73/159 |
| 2015/0008640 A1* | 1/2015 | Kambayashi | B65H 5/062 271/265.04 |
| 2015/0356806 A1* | 12/2015 | Xie | B65H 7/02 271/265.04 |
| 2016/0203666 A1 | 7/2016 | Chang et al. | |
| 2017/0075278 A1* | 3/2017 | Yoshimura | G03G 15/607 |

FOREIGN PATENT DOCUMENTS

| | | |
|---|---|---|
| CN | 102722933 A | 10/2012 |
| CN | 102842166 A | 12/2012 |
| CN | 102968847 A | 3/2013 |
| CN | 103106729 A | 5/2013 |
| CN | 103136840 A | 6/2013 |
| CN | 103136841 A | 6/2013 |
| CN | 103136842 A | 6/2013 |
| CN | 203149705 U | 8/2013 |
| CN | 103453830 A | 12/2013 |
| CN | 203443538 U | 2/2014 |
| CN | 103903328 A | 7/2014 |
| CN | 203733194 U | 7/2014 |
| CN | 104091387 A | 10/2014 |
| CN | 204087327 U | 1/2015 |
| CN | 104574637 A | 4/2015 |
| EP | 2860708 A1 | 4/2015 |
| JP | H 01-197252 A | 8/1989 |
| JP | 2002-179289 A | 6/2002 |
| JP | 2003-269904 A | 9/2003 |
| JP | 2005-258610 A | 9/2005 |
| JP | 2008-044739 A | 2/2008 |
| JP | 2011-184124 A | 9/2011 |
| JP | 2013-149018 A | 8/2013 |

* cited by examiner

THICKNESS DETECTION DEVICE FOR SHEET MEDIUM

This application is the national phase of International Application No. PCT/CN2015/086467, titled "THICKNESS DETECTION DEVICE FOR SHEET MEDIUM", filed on Aug. 10, 2015 which claims priority to Chinese patent application No. 201510062226.9 titled "THICKNESS DETECTION DEVICE FOR SHEET-TYPE MEDIUM", filed with the Chinese State Intellectual Property Office on Feb. 5, 2015, the entire disclosures of both applications are incorporated herein by reference.

FIELD

The present application relates to a thickness detection device for sheet-type medium, and particularly to a detection device for detecting the thickness of sheet-type valuable document in a financial self-service equipment.

BACKGROUND

In financial self-service equipments, for verifying sheet-type valuable documents (such as banknotes, checks, bills of exchange) processed in batches one by one, a whole stack of sheet-type valuable documents are required to be separated from each other one by one. And then identification means such as image identification, thickness detection and magnetic information detection are performed on the separated individual sheet-type valuable documents, to ensure that a newness degree and authenticity of the sheet-type valuable documents that are processed meet the requirements. The thickness detection is a critical module which is indispensable in the whole detection. The main function of the thickness detection device is to detect thickness signals of a passing sheet-type medium, and determine, according to the thickness signals, a new and old degree of the sheet-type valuable document processed, whether a foreign matter is adhered to the surface of the valuable document and the like. It may be further determined whether the valuable document separated by the machine is a single sheet, i.e., whether the separated banknote is actually two banknotes stacked, to ensure the accuracy of the counting.

An existing thickness detection device consists of two parts, which are respectively a detected body part and a sensor detection part. The principle of thickness detection is that: when a sheet-type medium (for example a banknote) to be detected passes through a thickness detection device, the thickness of the banknote causes variation of a distance between the detected body and a sensor. This variation of the distance causes variation of a detection physical quantity, and accordingly, the sensor outputs an electric signal corresponding to the variation. The varied electric signal, after being amplified by an amplifier, is transmitted to a subsequent processing circuit consisting of a micro-processor or a hardware circuit to be processed. Then, it is determined whether the thickness of the passing sheet-type medium meets the standard, to determine whether a surface of the sheet-type medium is adhered with a foreign matter, whether the banknote is a single sheet, and the like.

Figure 1:
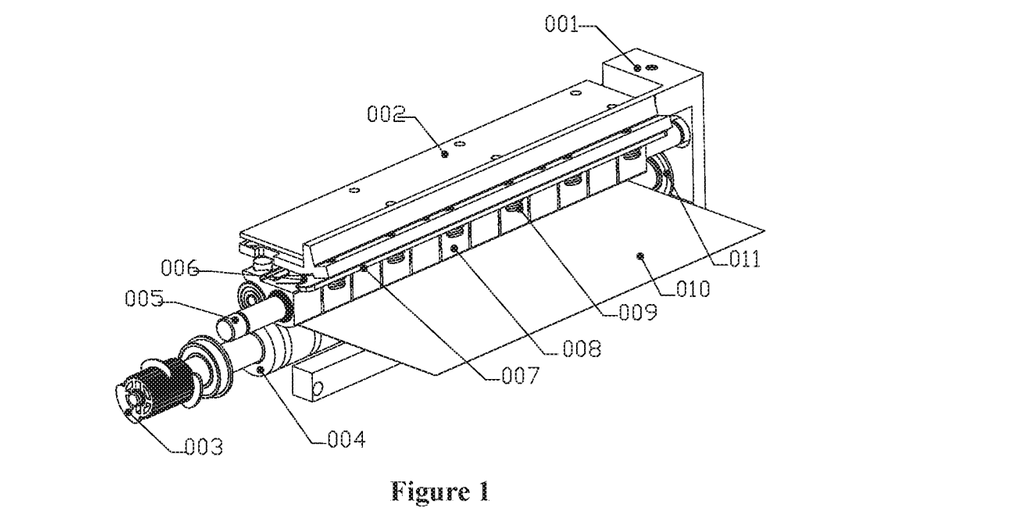
FIG. 1 is a schematic view of a conventional thickness detection device used in a financial equipment.

A common banknote thickness detection device has a structure as shown in FIG. 1, and the working principle thereof is described as follows.

Multiple driven wheel assemblies 008 are mounted on an assembly shaft 005, and the assembly shaft 005 is mounted on a module frame 001. A driving shaft 004 is mounted on the module frame 001 by flange bearings 011. Leaf springs 006 are mounted on the module frame 001 by a pressing plate 007 and screws 009. The leaf springs 006, after being deformed, apply a pressure on the multiple driven wheel assemblies 008, and the pressure may drive the multiple driven wheel assemblies 008 to fit the driving shaft 004 to form a passage for conveying a banknote 010. Power transmitted from outside acts on a driving wheel 003 mounted on the driving shaft 004, to drive the driving shaft 004 to rotate. The driving shaft 004 drives bearings on the driven wheel assemblies 008 which is in contact with the driving shaft 004 by friction, to generate a power for conveying the banknote 010. A signal detection plate 002 is mounted on an upper portion of the module frame 001.

Figure 2:
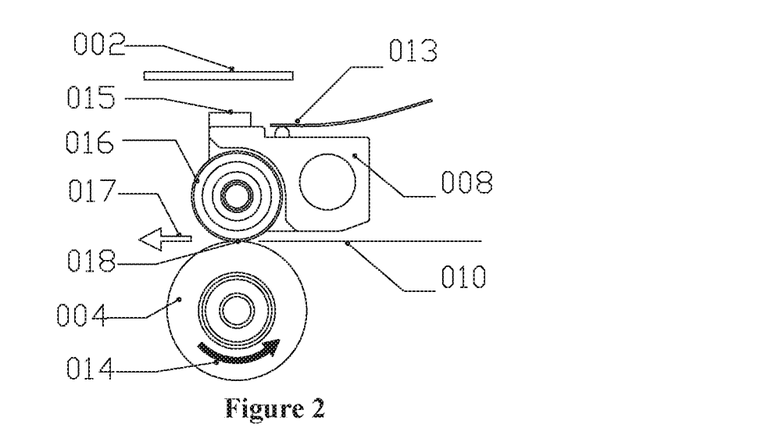
FIG. 2 is a schematic side view showing the thickness detection by the detection device in FIG. 1.

FIG. 2 shows a working state of the above device. After the multiple driven wheel assemblies 008 and the driving shaft 004 are mounted, the leaf spring 006 in a free state may be changed into a deformed leaf spring 013 in a working state. The deformed leaf spring 013 applies an action force on the driven wheel assembly 008, thereby applying an action force on the driving shaft 004 in contact with a driven wheel 016 via the driven wheel 016 and forming a passage 017 for conveying the banknote 010. The direction of the passage 017 is determined by an action force 014 acting on the driving wheel 003 transmitted from outside, and the passage 017 may be a bi-directional passage. The driven wheel 016 is in contact with the driving shaft 004 to form a thickness detection point 018. When the banknote 010 is conveyed along the passage 017 and passes the thickness detection point 018, the variation of the banknote 010 in the thickness direction may be detected by the signal detection plate 002 via a height variation of a thickness measurement block 015. The multiple driven wheel assemblies 008 may cover the banknote 010 in the length direction of the banknote, and all the thickness variations of the banknote 010 may be detected as time passes and are converted into a thickness image by the signal detection plate 002 to be transmitted to an external identification system, and the thickness information of the banknote is processed.

Figure 3:
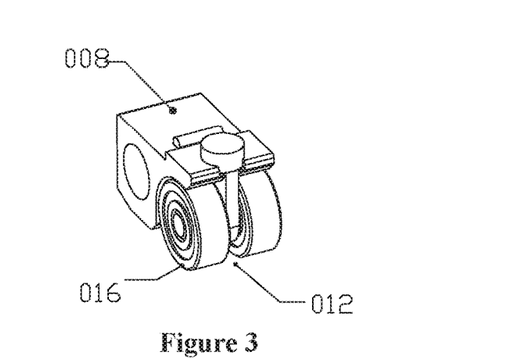
FIG. 3 is a schematic view of a detection roller assembly in the detection device in FIG. 2.

The above banknote thickness detection device has the following issues: the thickness measurement block 015 is fixed on the driven wheel assembly 008, and the driven wheel assembly 008 rotates about the component shaft 005, a displacement generated by the thickness measurement block 015 has components in two directions, i.e., a displacement in the banknote thickness direction and a displacement in the banknote moving direction. Since the displacement in the banknote moving direction may adversely affect the detection result of the signal detection plate, the electric signal outputted by the sensor is not accurate. This error is just caused by the displacement of the thickness measurement block 015 in the banknote moving direction. A gap 012 exists between two driven wheels 016 mounted in the driven wheel assembly 008, as shown in FIG. 3. When the banknote 010 passes the detection point 018, the thickness of a portion, corresponding to the gap 012, of the banknote cannot be detected, therefore, the above banknote thickness detection device cannot detect the thickness of the full banknote.

A technical issue to be addressed by the present application is to overcome the deficiencies described above, to provide a thickness detection device for a banknote, in which a detected body only has a displacement in the thickness direction, and a thickness of the full banknote can be detected.

SUMMARY

In view of the above issues in the conventional technology, an object of the present application is to provide a high precision thickness detection device for a banknote, which can detect the thickness of the full banknote.

The thickness detection device for sheet-type medium includes a fixing frame, configured to mount and bear a reference shaft and a detection assembly shaft;

the reference shaft has two ends mounted on the fixing frame via bearings, one end of which is driven by power, and a reference roller is fixedly sleeved on the reference shaft;

the detection assembly shaft is fixedly mounted on the fixing frame, the distance between the detection assembly shaft and the reference shaft is relatively fixed, and at least one detection roller is provided on the detection assembly shaft, and the detection roller is in an elastic contact with the reference roller;

the detection roller is sleeved on the detection assembly shaft by a bracket, the bracket has an elongated hole through which the bracket is sleeved on the detection assembly shaft, an elastic element is provided between an end of the elongated hole and the detection assembly shaft, and the elastic element enables the detection assembly shaft to elastically maintain a certain distance from the end of the elongated hole, the elastic element applies an action force on the bracket towards the reference shaft, to enable the detection roller to be in an elastic contact with the reference roller, one side, away from the reference roller, of the detection roller is provided with a distance detector, and the distance detector is fixedly arranged on the fixing frame and directly faces the detection roller.

Preferably, the detection roller is a detection roller group formed by at least two detection rollers and mounted on the detection assembly shaft through a bracket.

Further, the number of the detection roller group is at least two, and the at least two detection roller groups are arranged in parallel with each other in an axial direction of the detection assembly shaft.

Preferably, the detection assembly shaft has two lateral planes which are relatively parallel, and the detection assembly shaft and the bracket are assembled to allow the lateral planes to correspond to long edges of the elongated hole of the bracket.

Preferably, the elastic element is an arc-shaped elastic strip.

Further, the arc-shaped elastic strip is arranged inside the elongated hole at an end close to the reference roller.

The thickness detection device has the following advantages compared with those in the conventional technology.

In this thickness detection device, variation of the distance between the detection roller and the reference roller in one direction is achieved by technical means of sleeving the detection rollers on the reference roller in series and employing the elastic element and the bracket, thereby addressing the issue that a detection roller is displaced in a moving direction of a banknote in the conventional technology. Therefore the thickness signal obtained is not interfered by displacements in other directions, and since the adjacent floating detection rollers closely fit each other, no gap exist therebetween, thereby really achieving the effect of detection of the full banknote.

DETAILED DESCRIPTION

For further illustrating the thickness detection device for sheet-type medium according to the present application, the detection device is further described in detail hereinafter with reference to drawings of a preferred embodiment of the present application.

Figure 4:
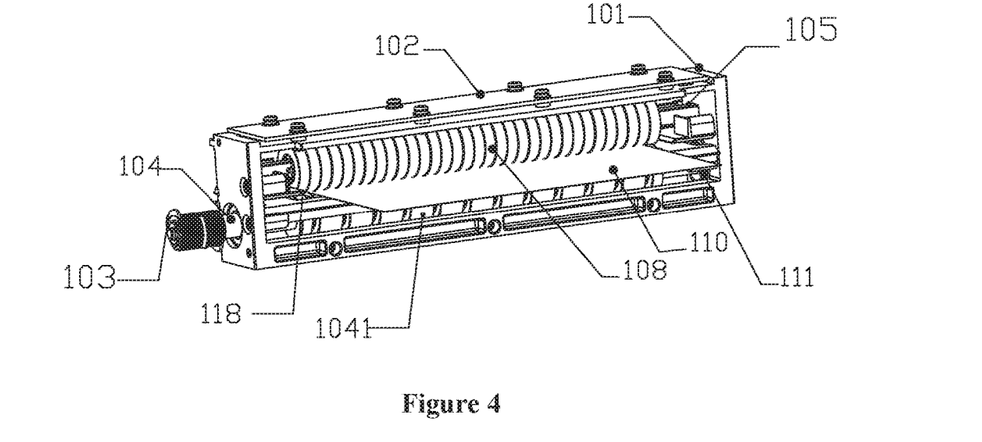
FIG. 4 is a schematic perspective view of a thickness detection device for sheet-type medium according to the present application.

Referring to FIG. 4, a preferred thickness detection device for sheet-type medium according to the present application includes a fixing frame 101 configured to mount and bear the following parts: a reference shaft 104, and a detection assembly shaft 105. The reference shaft 104 has two ends mounted on the fixing frame 101 via bearings 111, and one end of which is driven by power. A reference roller 1041 is fixedly sleeved on the reference shaft 104. The detection assembly shaft 105 is fixedly mounted on the fixing frame 101, and a distance from the detection assembly shaft 105 to the reference shaft 104 is relatively fixed. At least one detection roller 116 is arranged on the detection assembly shaft 105. The detection roller 116 is in an elastic contact with the reference roller 1041. A detection passage 118 for a sheet-type medium 110 to pass is defined between the detection roller 116 and the reference roller 1041.

Figure 5:
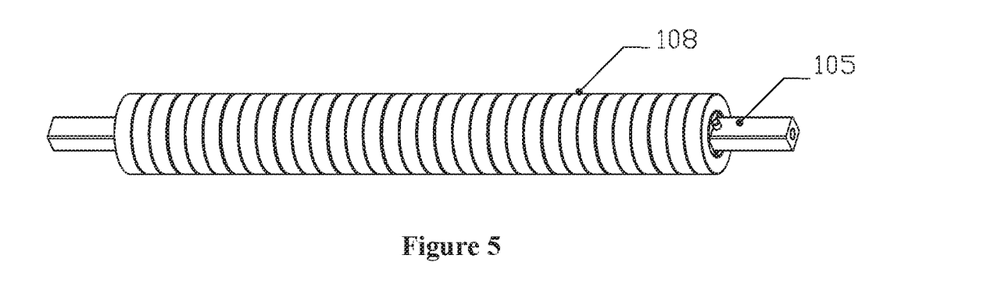
FIG. 5 is a schematic view showing the assembling of a detection assembly in the detection device in FIG. 4.
Figure 6:
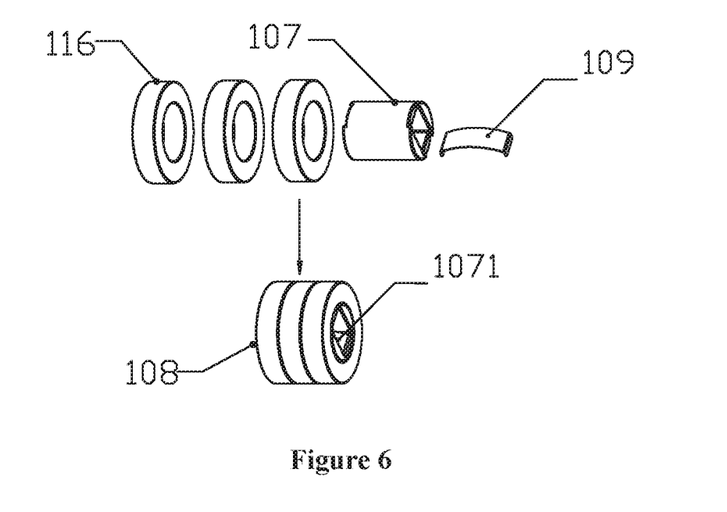
FIG. 6 is a schematic view showing the assembling relationship between detection rollers and a bracket in the detection assembly in FIG. 5.

Referring to FIGS. 5 and 6, the detection rollers 116 are mounted on the bracket 107 in groups with each group including three detection rollers, to form a detection assembly 108. The detection assembly 108 is then sleeved on the detection assembly shaft 105 to be mounted thereon. The bracket 107 has an elongated hole 1071 through which the bracket is sleeved on the detection assembly shaft 105, and an elastic element 109 is provided between one end of the elongated hole 1071 and the detection assembly shaft 105. The elastic element 109 allows the detection assembly shaft 105 to elastically maintain a certain distance from one end, adjacent to the reference roller 1041, of the elongated hole 1071. In this embodiment, the distance is set to be greater than a thickness of a single sheet of a standard banknote. The elastic element 109 applies an action force on the bracket 107 towards the reference shaft 104, to enable the detection roller 116 to be in an elastic contact with the reference roller 1041. One side, away from the reference roller 1041, of the detection roller 116 is provided with a distance detector (not illustrated). The distance detector is fixedly arranged on the fixing frame 101 and directly faces the detection roller 116. It is to be noted that, the distance detector has a signal detection plate 102 configured to process information acquired by the distance detector. In order to detect the thickness of the full sheet-type medium, as shown in FIG. 5, the detection roller group according to this embodiment is a group formed by three detection rollers, and the total number of the detection roller groups provided is eleven. The eleven detection roller groups are arranged in parallel in an axial direction of the detection assembly shaft 105. Apparently, the number of the detection rollers 116 may be increased or decreased according to a width of the medium detected practically.

Figure 7:
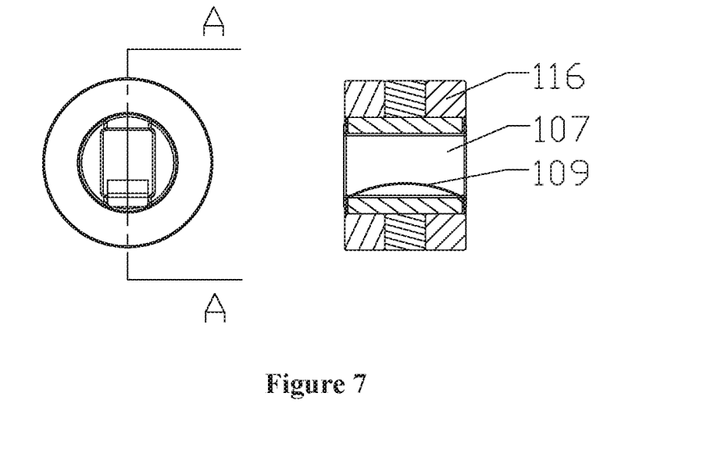
FIG. 7 is a schematic sectional view of the detection roller group in FIG. 6 taken along direction A-A.
Figure 8:
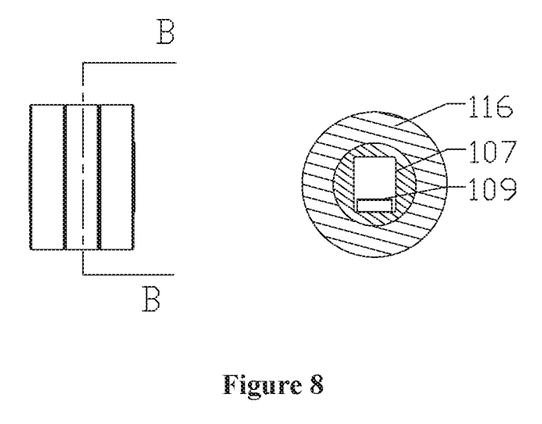
FIG. 8 is a schematic sectional view of the detection roller group in FIG. 6 taken along direction B-B.

Referring to FIGS. 6 to 8, the detection roller assembly of the thickness detection device for sheet-type medium according to the present application is described in detail. For achieving a displacement of the detection roller 116 with respect to the reference roller 1041 in one dimensional direction, and a relative zero phase assembly between the bracket 107 and the detection assembly shaft 105, the detection assembly shaft 105 has two lateral planes which are relatively parallel, and the detection assembly shaft 105 and the bracket are assembled to allow the lateral planes to be corresponding to long edges of the elongated hole 1071 of the bracket 107. Preferably, the detection assembly shaft 105 is embodied as a rectangular shaft. In this embodiment, the elastic element 109 is an arc-shaped elastic strip. The elastic element 109 is mounted inside the elongated hole 1071 of the bracket 107 at an end close to the reference shaft 104. The elastic element 109 enables the detection assembly shaft 105 to maintain a certain distance from the end of the elongated hole 1071. The elastic element 109 applies an action force on the bracket 107 towards the reference shaft 104, to allow the detection assembly shaft 105 to elastically maintain a certain distance from an inner wall, in the thickness detection direction, of the bracket 107. It is to be noted that the elastic element 109 may also be embodied in other forms, such as a spring.

The working principle of the thickness detection device for sheet-type medium is described hereinafter with reference to FIGS. 3, 9 and 10. When the thickness detection device for sheet-type medium is in a standby state, the detection roller 116 is supported by the bracket 107, and the bracket 107 is subjected to the actions of the elastic element 109 and the detection assembly shaft 105, to allow the detection roller 116 to be in a close contact with the reference roller 03. When the sheet-type medium 110 enters the thickness detection device, a power transmitted from outside acts on a driving wheel 103 mounted on the reference shaft 104, to drive the reference shaft 104 to rotate. The reference roller 1041 in turn drives the detection roller 116 to be in contact with the reference roller 1041 to rotate by friction, to generate a power for conveying the sheet-type medium 110. When the sheet-type medium 110 is drawn into the detection passage 118 defined by the detection rollers 116 and the reference rollers 1041, since the reference roller is fixed, the detection roller 116 may be displaced by squeezing the elastic element 109, the distance detector detects displacement signals of the detection roller 116, and the displacement signals of the highest point of the driven wheel 116 are recorded by the signal detection plate 102 in real time, thus achieving the thickness detection of the sheet-type medium 110 passing through.

Figure 9:
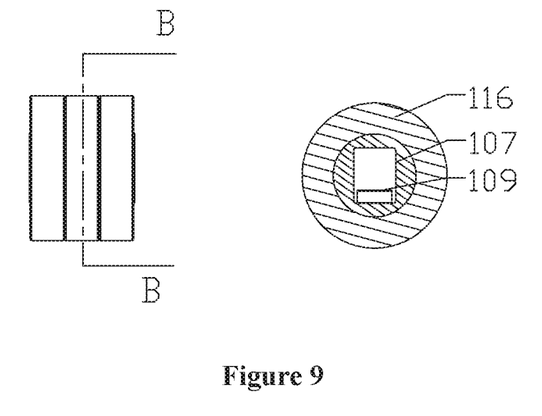
FIG. 9 shows a state of the detection assembly of the thickness detection device according to the present application before and after a banknote passes.

As shown in FIG. 9, when the sheet-type medium 110 has not yet entered the detection passage 118, the elastic element 109 is deformed due to being compressed, the deformation causes an upward pressure to the detection assembly shaft 105. Since the detection assembly shaft 105 is fixed on the fixing frame 101 and cannot move, the pressure is transmitted to the detection roller 116, to press the detection roller 116 towards the reference shaft 104 to closely fit the reference roller 1041.

Figure 10:
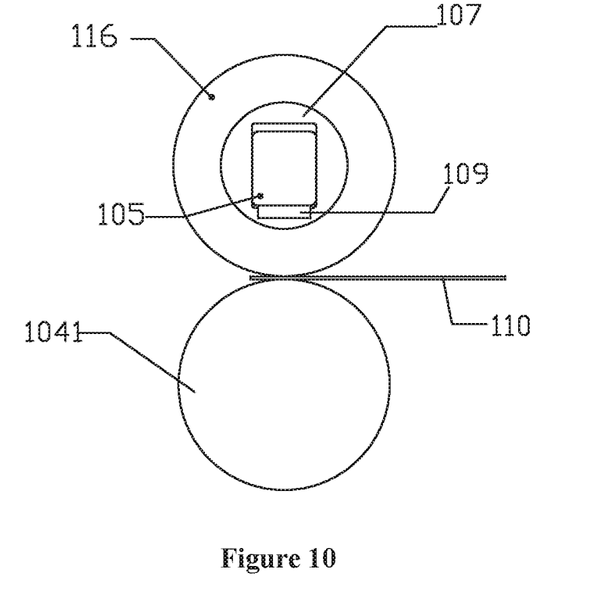
FIG. 10 shows a state of the detection assembly of the thickness detection device according to the present application when a banknote is passing.

As shown in FIG. 10, when the sheet-type medium 110 passes through the detection passage 118, two sides of the sheet-type medium 110 squeeze the reference roller 1041 and the detection roller 116 respectively. The sheet-type medium 110 moves forward under the action of friction of the reference roller 1041, and the detection roller 116 rotates under the action of the friction of the sheet-type medium 110 with a rotating direction opposite to that of the reference roller 1041. Since the reference roller 1041 is fixed with respect to the fixing frame 101, the sheet-type medium 110 can only squeeze the detection roller 116 upwards in the thickness direction, and the bracket 107 is displaced, at this time, the elastic element 109 is compressed. After the whole sheet-type medium 110 passes through the detection passage 118, the elastic element 109 extends to be restored, to generate a downward elastic force to the bracket 107, to move the detection roller 116 to be reset, till the detection roller 116 closely fits the detection roller 1041 again. The signal detection plate 102 records, in real time, displacements of the highest point of the detection roller 116 in the whole process of the sheet-type medium 110 entering the detection passage 118, and converts the displacements into thickness signals, the thickness signals are transferred to an external identification system, and further identification processes, such as determining whether the sheet-type medium meets the requirement, and whether the sheet-type medium has a foreign matter stuck thereon, are performed.

The above description is only preferred embodiments of the present application. It should be noted that, the above preferred embodiments should not be deemed as a limitation to the present application, and the scope of the present application is defined by the claims of the present application. For those skilled in the art, several improvements and modifications may be made to the present application without departing from the spirit and scope of the present application, and these improvements and modifications are also deemed to fall into the scope of the present application.

The invention claimed is:

1. A thickness detection device for sheet-type medium, comprising:

a fixing frame, configured to mount and bear a reference shaft and a detection assembly shaft;

the reference shaft, which has two ends mounted on the fixing frame via bearings, and one end of which is driven by power, a reference roller being fixedly sleeved on the reference shaft; and the detection assembly shaft, which is fixedly mounted on the fixing frame and has a relatively fixed distance from the detection assembly shaft, at least one detection roller being provided on the detection assembly shaft, and the detection roller being in an elastic contact with the reference roller;

wherein the detection roller is sleeved on the detection assembly shaft by a bracket, the bracket has an elongated hole through which the bracket is sleeved on the detection assembly shaft;

an elastic element is provided between an end of the elongated hole and the detection assembly shaft, and the elastic element allows the detection assembly shaft to elastically maintain a certain distance from the end of the elongated hole;

the elastic element applies an action force on the bracket towards the reference shaft, to enable the detection roller to be in an elastic contact with the reference roller; and one side of the detection roller, which side is away from the reference roller, is provided with a distance detector, and the distance detector is fixedly arranged on the fixing frame and directly faces the detection roller.

2. The thickness detection device for sheet-type medium according to claim 1, wherein the detection roller is a detection roller group which is formed by at least two detection rollers and mounted on the detection assembly shaft by a bracket.

3. The thickness detection device for sheet-type medium according to claim 2, wherein the number of the detection roller group is at least two, and the at least two detection roller groups are arranged in parallel with each other in an axial direction of the detection assembly shaft.

4. The thickness detection device for sheet-type medium according to claim 1, wherein the detection assembly shaft has two lateral planes which are relatively parallel, and the detection assembly shaft and the bracket are assembled to allow the lateral planes to correspond to long edges of the elongated hole of the bracket.

5. The thickness detection device for sheet-type medium according to claim 1, wherein the elastic element is an arc-shaped elastic strip.

6. The thickness detection device for sheet-type medium according to claim 5, wherein the arc-shaped elastic strip is arranged inside the elongated hole at an end close to the reference roller.

\* \* \* \* \*